(12) United States Patent
Kim et al.

(10) Patent No.: US 11,752,859 B2
(45) Date of Patent: Sep. 12, 2023

(54) FUEL MEASUREMENT SYSTEM AND FUEL GAUGE ERROR REDUCTION METHOD USING THE SAME

(71) Applicants: HYUNDAI MOTOR COMPANY, Seoul (KR); KIA Corporation, Seoul (KR)

(72) Inventors: Dong Hyun Kim, Hwaseong-si (KR); Jung Hoon Park, Suwon-si (KR); Keun Soo Kim, Yongin-si (KR)

(73) Assignees: HYUNDAI MOTOR COMPANY, Seoul (KR); KIA Corporation, Seoul (KR)

( * ) Notice: Subject to any disclaimer, the term of this patent is extended or adjusted under 35 U.S.C. 154(b) by 183 days.

(21) Appl. No.: 17/363,359

(22) Filed: Jun. 30, 2021

(65) Prior Publication Data
US 2022/0089020 A1    Mar. 24, 2022

(30) Foreign Application Priority Data

Sep. 23, 2020 (KR) .................. 10-2020-0122791

(51) Int. Cl.
*B60K 15/06* (2006.01)
*G01F 23/80* (2022.01)
*B60K 15/03* (2006.01)

(52) U.S. Cl.
CPC ............ *B60K 15/061* (2013.01); *G01F 23/80* (2022.01); *B60K 2015/03217* (2013.01)

(58) Field of Classification Search
None
See application file for complete search history.

(56) References Cited

U.S. PATENT DOCUMENTS

| | | | | |
|---|---|---|---|---|
| 2006/0027017 A1* | 2/2006 | Kamatsuke | ............ | F02D 33/00 73/1.73 |
| 2008/0133075 A1* | 6/2008 | St-Pierre | ............... | B63H 11/08 701/21 |
| 2010/0145638 A1* | 6/2010 | Begin | ................... | G01F 23/804 702/55 |
| 2011/0010070 A1* | 1/2011 | Bohr | ..................... | G01F 23/804 73/1.73 |

FOREIGN PATENT DOCUMENTS

KR    10-2018-0124601 A    11/2018
KR    10-2020-0111544 A     9/2020

* cited by examiner

*Primary Examiner* — Paul M. West
*Assistant Examiner* — Mark A Shabman
(74) *Attorney, Agent, or Firm* — MORGAN, LEWIS & BOCKIUS LLP

(57) ABSTRACT

A fuel measurement system and a fuel gauge error reduction method are provided. The fuel gauge error reduction method includes determining a driving mode of a vehicle based on an external input condition; calculating a remaining amount of fuel using a different manner corresponding to each driving mode; and providing the calculated remaining amount of fuel.

13 Claims, 3 Drawing Sheets

FUEL MEASUREMENT SYSTEM AND FUEL GAUGE ERROR REDUCTION METHOD USING THE SAME

CROSS-REFERENCE TO RELATED APPLICATION

The application claims priority to and the benefits of Korean Patent Application No. 10-2020-0122791, filed Sep. 23, 2020, which is hereby incorporated by reference in its entirety for all purposes.

TECHNICAL FIELD

The present disclosure relates to a fuel measurement system and a fuel gauge error reduction method using the same.

BACKGROUND

A fuel measurement system of a vehicle includes a fuel sending unit located in a fuel tank and a fuel gauge provided on an instrument cluster. The fuel sending unit includes a float configured to move according to the level of fuel in the fuel tank while floating on the surface of the fuel. Resistance changes depending on a change in the position of the float. The resistance change is transmitted to the instrument cluster. The remaining amount of fuel is indicated as the resistance change is displayed as the movement of a pointer of the fuel gauge.

Since the float moves according to the fuel level, the float may be frequently fluctuated due to sloshing of the fuel in the fuel tank during vehicle driving. Damping time is used in the fuel measurement system such that such frequent changes of the fuel level are not displayed through the fuel gauge, i.e., such that only change in the remaining fuel amount due to fuel consumption is displayed. The damping time is a value set to limit a time for the fuel gauge to move from a full state (F) to an empty state (E).

Although no issue may be observed under general driving situations, a problem in relation to application of the damping time may occur during circuit driving where high output is continued. That is, a change of the fuel gauge limited according to the damping time (a set damping time value) fails to follow a change in actual fuel consumption during the circuit driving (a response time during the circuit driving) and blocks lowering of the fuel gauge.

In order to prevent such a situation, if the damping time is reduced the tracking ability of the fuel gauge during circuit driving may be enhanced. However, the fuel gauge may frequently fluctuate during general driving in this case.

The foregoing is intended merely to aid in the understanding of the background of the present disclosure, and is not intended to mean that the present disclosure falls within the purview of the related art that is already known to those skilled in the art.

SUMMARY

The present disclosure provides a fuel gauge error reduction method capable of reducing an error of a fuel gauge during high-output driving.

The present disclosure are not limited to those described above, and other unmentioned objects of the present disclosure will be clearly understood by a person of ordinary skill in the art from the following description.

In an aspect of the present disclosure, a fuel gauge error reduction method comprises determining a driving mode of a vehicle based on an external input condition, wherein the remaining amount of fuel is calculated in a different manner for each driving mode; calculating the remaining amount of fuel using a manner of the determined driving mode; and providing the calculated remaining amount of fuel.

In another aspect of the present disclosure, a fuel measurement system comprises a controller configured to determine a driving mode of a vehicle based on an external input condition and to calculate a remaining fuel quantity in a different manner for each driving mode; and a fuel gauge configured to provide the remaining fuel quantity calculated by the controller.

Other aspects and preferred forms of the present disclosure are discussed infra.

The above and other features of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles, e.g., fuels derived from resources other than petroleum. As referred to herein, a hybrid vehicle is a vehicle that has two or more sources of power, for example both gasoline-powered and electric-powered vehicles.

DRAWINGS

DETAILED DESCRIPTION

Figure 1:
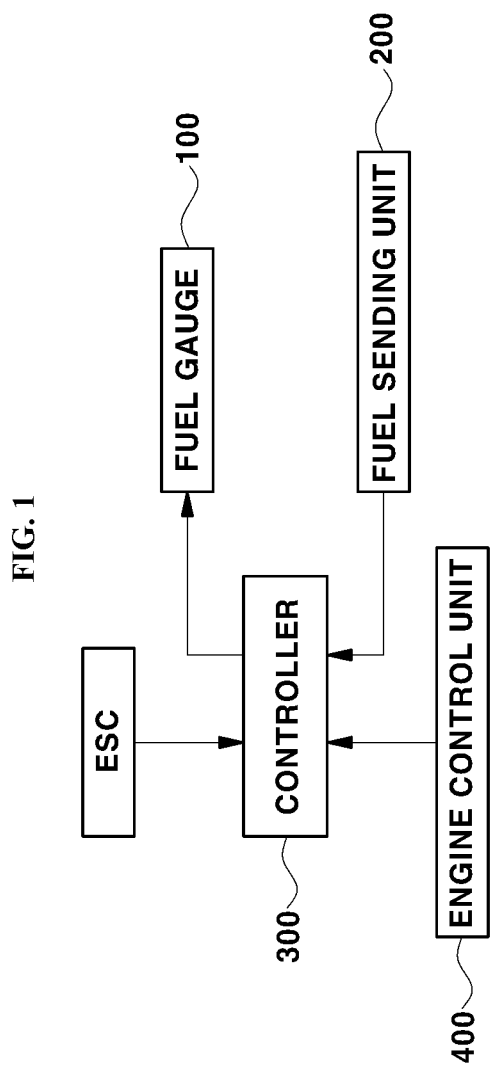
FIG. 1 is a view showing a configuration of a fuel measurement system in one form of the present disclosure.

Hereinafter, preferred forms of the present disclosure will be described in detail with reference to the accompanying drawings. Specific structures or functions described in some forms of the present disclosure are merely for illustrative purposes. Some forms of the present disclosure may be implemented in various forms, and it should be understood that they should not be construed as being limited to the forms described in the present specification, but include all of modifications, equivalents, or substitutes included in the spirit and scope of the present disclosure.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

Like reference numerals denote like components throughout the specification. In the meantime, the terminology used herein is for the purpose of describing particular forms only and is not intended to be limiting. As used herein, the singular forms "a," "an," and "the" are intended to include the plural forms as well, unless the context clearly indicates otherwise. It will be further understood that the terms "comprise," "include," "have," etc., when used in this specification, specify the presence of stated components, steps, operations, and/or elements, but do not preclude the presence or addition of one or more other components, steps, operations, and/or elements thereof.

In some forms of the present disclosure, application of damping time in relation to display the remaining amount fuel may be selected based on ON/OFF of an Electronic Stability Control (ESC) of a vehicle, whereby no separate tuning is necessary and a possibility of human error occurrence can be excluded.

Hereinafter, the present disclosure will be described in detail with reference to the accompanying drawings.

As shown in FIG. 1, a fuel measurement system for vehicles includes a fuel gauge 100, a fuel sending unit 200, and a controller 300. The fuel gauge 100 is provided in an instrument cluster in a vehicle, and the fuel sending unit 200 is disposed in a fuel tank. The controller 300 controls operation of the fuel gauge 100. More specifically, the controller 300 processes an electrical signal sent from the fuel sending unit 200, the electrical signal being changed based on the remaining amount of fuel. The controller 300 is also configured to control the fuel gauge 100 to indicate the remaining amount of fuel on the instrument cluster based on the processed signal. The controller 300 is configured to communicate with an engine control unit 400. In particular, the controller 300 is configured to receive information about Fuel COnsumption (FCO) of an engine.

In some forms of the present disclosure, the controller 300 acquires the remaining amount of fuel in different manners depending on driving modes of the vehicle. The driving modes of the vehicle include a general driving mode and a circuit driving mode. In this specification, the general driving mode and the circuit driving mode are modes to which different logics are applied in displaying the remaining amount of fuel. The general driving mode, which means a general driving situation, is a mode in which tracking of the fuel gauge 100 based on damping time is substantially accurately performed. The circuit driving mode, which means a driving situation requiring high load and high output, is a mode in which an error or a delay occurs in the tracking of the fuel gauge 100 based on damping time.

The damping time is a value set to limit a time for the fuel gauge 10 to move from a full state (F) to an empty state (E) where the full state (F) means a full tank and the empty state E means an empty tank. The damping time may be set to a certain value for each vehicle speed sections.

The controller 300 may determine driving modes based on an external input condition and acquire the remaining amount of fuel in different manners for each driving mode. In some forms of the present disclosure, the external input condition includes operation information of the electronic stability control (ESC) input to the controller 300. In other words, the controller 300 is configured to determine whether the driving mode of the vehicle is a general driving mode or a circuit driving mode depending on the operation information of the electronic stability control (ESC). To this end, the controller 300 may communicate with the electronic stability control (ESC) and check whether the electronic stability control (ESC) is turned ON or OFF to determine the current driving mode of the vehicle.

The electronic stability control (ESC) is a device that monitors the stability of the vehicle and adjusts engine output and braking when a dangerous situation occurs. The adjustment of engine output is performed to prevent wheel spin at the time of abrupt acceleration, and the adjustment of braking is performed by controlling oversteer, etc., during turning through adjustment of brake output of each wheel to control the vehicle stability. The adjustment of engine output and braking through the electronic stability control (ESC) may be selectively turned on or off.

During the circuit driving requiring driving under abrupt acceleration and high lateral force, the electronic stability control (ESC) is not virtually used. In some forms of the present disclosure, therefore, when the electronic stability control (ESC) is OFF, it is determined that the vehicle has entered the circuit driving mode. In addition, in some forms of the present disclosure, when a sport mode among set driving modes of the vehicle is ON, it is determined that the current driving mode is a circuit driving mode. The sport mode is one of the set driving modes which include a normal mode, an eco-mode, and a sport mode, which have been provided in many vehicles in recent years. The sport mode is different in concept from the general driving mode and the circuit driving mode in this specification, but is included in the circuit driving mode.

If the driving mode of the vehicle is a general driving mode, the controller 300 applies damping time to a signal from the fuel sending unit 200 for each vehicle speed to calculate a position value of a pointer of the fuel gauge 100 and disposes the pointer of the fuel gauge 100 at the calculated pointer position value.

If the driving mode of the vehicle is a circuit driving mode, the controller 300 does not receive the remaining amount of fuel from the fuel sending unit 200 but receives and cumulatively sums the fuel consumption (FCO) information. The controller 300 calculates the position value for the pointer of the fuel gauge 100 using the cumulatively summed fuel consumption (FCO) information and operates the fuel gauge 100 in accordance with the calculated pointer location value. That is, the controller 300 may acquire the current remaining amount of fuel by subtracting the cumulatively summed fuel consumption (FCO) from the remaining amount of fuel in the previous driving mode.

Figure 2:
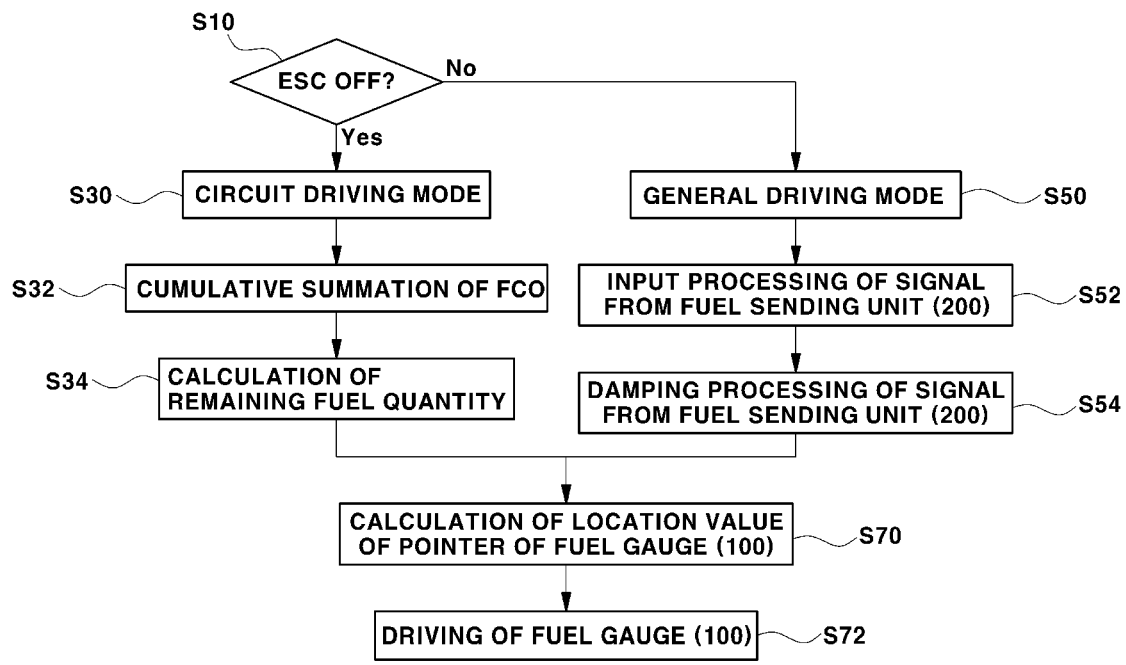
FIG. 2 is a flowchart showing a fuel gauge error reduction method in one form of the present disclosure.

FIG. 2 is a flowchart showing a fuel gauge error reduction method in some forms of the present disclosure.

Referring to FIG. 2, the controller 300 checks whether the electronic stability control (ESC) is turned ON or OFF to determine the current driving mode of the vehicle (S10). That is, the controller determines the driving mode such that a suitable logic for calculating the remaining amount of fuel for each driving mode is applied.

If the electronic stability control (ESC) is OFF, the controller 300 determines that the driving mode is a circuit driving mode (S30). Subsequently, the controller 300 acquires the fuel consumption (FCO) from the engine control unit 400, rather than remaining fuel quantity information from the fuel sending unit 200, and cumulatively sums the fuel consumption (FCO). As previously described, the controller calculates the remaining amount of fuel obtained by subtracting the cumulatively summed the fuel consumption (FCO) from the remaining fuel quantity in the previous mode (S34). The controller 300 calculates the pointer position value of the fuel gauge 100 based thereon (S70) and operates the fuel gauge 100 to the calculated pointer position value (S72).

On the other hand, when the electronic stability control (ESC) is ON, the controller 300 determines that the driving mode is a general driving mode (S50). Subsequently, the controller 300 receives fuel level information from the fuel sending unit 200 (S52) and applies damping time predetermined based on vehicle speed to the received fuel level information (S54). The controller calculates the pointer position value of the fuel gauge 100 based on the fuel level after application of the damping time (S70) and operates the fuel gauge 100 to the calculated pointer position value (S72).

Figure 3:
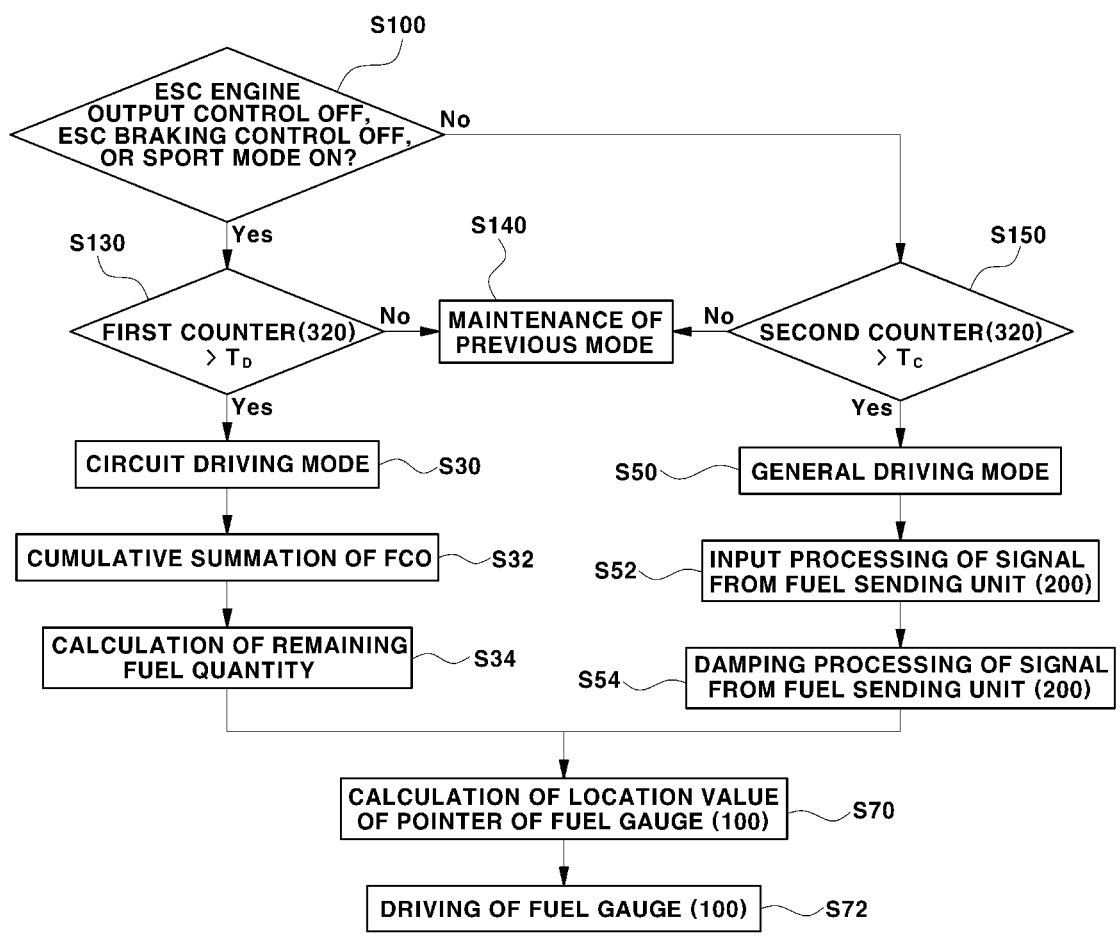
FIG. 3 is a flowchart showing a fuel gauge error reduction method in one form of the present disclosure.

FIG. 3 is a flowchart showing a fuel gauge error reduction method in some forms of the present disclosure.

Referring to FIG. 3, the controller 300 checks whether the electronic stability control (ESC) is ON or OFF to determine the current driving mode of the vehicle, i.e., such that a logic for calculating the remaining amount of fuel, optimized for each driving mode, is applied. In some forms of the present disclosure, it is determined that the driving mode is a circuit driving mode when an engine output adjustment function of the electronic stability control (ESC) is OFF, a braking control function of the electronic stability control (ESC) is OFF, or the sport mode is ON (S100).

However, even if the engine output adjustment function is OFF, the braking control function of the electronic stability control (ESC) is OFF or the sport mode is ON, a predetermined time may be set and the driving mode may be finalized after the predetermined time.

To this end, in some forms of the present disclosure, a first counter 320 is set. The first counter 320 may be a timer included in the controller 300. The first counter 320 is initialized when any one of OFF of the engine output adjustment function of the electronic stability control (ESC), OFF of the braking control function of the electronic stability control (ESC), and ON of the sport mode is input. As a non-limiting example, an initialization value may be 0, and the value of the first counter 320 may be time, such as seconds or minutes.

At the point at which the electronic stability control (ESC) is OFF or the sport mode is ON, the first counter 320 is initialized, and a circuit driving mode is selected. However, the circuit driving mode is selected but not confirmed before the lapse of time preset by the first counter 320. The counts of the first counter 320 increases with time, and when the counts of the first counter 320 exceeds a predetermined entry delay time, $T_D$, from the point at which the electronic stability control (ESC) is OFF (S130), the controller 300 confirms that the driving mode is a circuit driving mode (S30). If the counts of the first counter 320 is equal to or less than the predetermined entry delay time, $T_D$, on the other hand, the previous driving mode is maintained (S140). That is, when a separate request, such as a request for turning ON of the electronic stability control (ESC), is input before the lapse of the entry delay time, $T_D$, the driving mode is returned to a previous driving mode, i.e., a general driving mode.

Similarly, when any one of ON of the engine output adjustment function of the electronic stability control (ESC), ON of the braking control function of the electronic stability control (ESC), and OFF of the sport mode is input, a predetermined time may be set and the driving mode may be confirmed after the predetermined time.

To this end, in some forms of the present disclosure, a second counter 340 is set. The second counter 340 may be a timer included in the controller 300. The second counter 340 is initialized upon determining that any one of ON of the engine output adjustment function of the electronic stability control (ESC), ON of the braking control function of the electronic stability control (ESC), and OFF of the sport mode is input. As a non-limiting example, an initialization value may be 0, and the value of the second counter 340 may be time, such as seconds or minutes.

At the point at which the electronic stability control (ESC) is ON or the sport mode is OFF, the second counter 340 is initialized, and a general driving mode is selected. However, the general driving mode is selected but not confirmed before the lapse of time preset by the second counter 340. The counts of the second counter 340 increases over time, and when the counts of the second counter 340 exceeds a predetermined exit delay time, $T_C$, from the point at which the electronic stability control (ESC) is ON (S150), the controller 300 confirms that the driving mode is a general driving mode (S50). If the counts of the second counter 340 is equal to or less than the predetermined exit delay time, $T_C$, on the other hand, the previous driving mode is maintained (S140). That is, when a separate request, such as a request for turning OFF of the electronic stability control (ESC), is input before the lapse of the exit delay time, $T_C$, the driving mode is returned to a previous driving mode, i.e., a circuit driving mode.

The entry delay time $T_D$ and the exit delay time $T_C$ provide the effect of reducing a gauge error at the time of switching between the general driving mode and the circuit driving mode. Also, the entry delay time $T_D$ and the exit delay time $T_C$ prevents frequent switching between the two modes or delay in the entry time or the exit time to reduce an error between actual fuel quantity and the fuel gauge displayed on the instrument cluster.

Upon determining that the driving mode is a circuit driving mode, the controller 300 performs steps S30 to S34 and S70 to S72 described above. In some forms of the present disclosure, the fuel consumption (FCO) value may be multiplied by a predetermined tuning value A. Since there exists an error between actual fuel consumption and the fuel consumption (FCO) information, the tuning value A may be multiplied to reduce the error. According thereto, the fuel consumption (FCO) multiplied by the tuning value A is cumulatively summed. Alternatively, the fuel consumption (FCO) may be cumulatively summed and then be multiplied by the tuning value A.

Upon confirming that the driving mode is a general driving mode, on the other hand, the controller 300 performs steps S50 to S54 and S70 to S72 described above.

In some forms of the present disclosure, it is not necessary to perform separate tuning for each vehicle by reflecting the ON/OFF state of the electronic stability control, whereby it is possible to greatly reduce an error in measuring the remaining fuel quantity during circuit driving while a human error occurrence possibility is very low.

As described above, in case of circuit driving in which driving under high load and high output is continuously performed, there is a problem due to application of damping time. In case the fuel gauge is inaccurately displayed in a situation in which pit-in for refueling is necessary, it is difficult to determine refueling timing. If refueling timing is missed, it is difficult to avoid retire due to the lack of fuel. Consequently, it is important to secure accuracy of the fuel gauge.

In some forms of the present disclosure, therefore, when the electronic stability control is OFF, the remaining amount of fuel is calculated based on fuel consumption of the engine, and the calculated remaining amount of fuel is displayed through the pointer of the fuel gauge. When the electronic stability control is ON, on the other hand, the remaining amount of fuel is calculated based on fuel level information of the fuel sending unit, and the calculated remaining amount of fuel is displayed through the pointer of the fuel gauge.

In some forms of the present disclosure, therefore, it is possible to enable the pointer of the fuel gauge to trace actual fuel consumption in any driving mode, whereby it is possible to solve the above problems.

As is apparent from the foregoing, the present disclosure provides a fuel gauge error reduction method capable of enabling a fuel gauge to accurately follow actual fuel consumption in both a general driving situation and a high-output driving situation.

It should be understood that the present disclosure is not limited to the above described forms and the accompanying drawings, and various substitutions, modifications, and alterations can be devised by those skilled in the art without departing from the technical spirit of the present disclosure.

What is claimed is:

1. A fuel gauge error reduction method comprising:
determining one of driving modes of a vehicle based on an external input condition, wherein the external input condition includes one of turning ON or OFF of an electronic stability control or turning ON or OFF of a sports mode among selectable driving modes of the vehicle;
in response that the electronic stability control is OFF or the sports mode is ON, determining that the vehicle is in a circuit driving mode;
calculating a remaining amount of fuel using a different manner corresponding to each driving mode, wherein the remaining amount of fuel is calculated based on fuel consumption of an engine in the circuit driving mode; and
providing the calculated remaining amount of fuel.

2. The fuel gauge error reduction method according to claim 1, further comprising: when the electronic stability control is ON or the sports mode is OFF, determining that the vehicle is in a general driving mode.

3. The fuel gauge error reduction method according to claim 2, further comprising: in the general driving mode, calculating the remaining amount of fuel based on a fuel level of a fuel tank.

4. The fuel gauge error reduction method according to claim 3, further comprising:
applying damping time preset based on vehicle speed to the fuel level to acquire the remaining amount of fuel; and
displaying the acquired the remaining amount of fuel through a fuel gauge.

5. The fuel gauge error reduction method according to claim 1, further comprising:
receiving and cumulatively summing the fuel consumption of the engine;
subtracting the cumulatively summed fuel consumption of the engine from a current remaining fuel quantity of a fuel tank; and
displaying the remaining amount of fuel that is acquired by subtracting the cumulatively summed fuel consumption of the engine from the current remaining fuel quantity of the fuel tank.

6. A fuel measurement system comprising:
a controller configured to:
determine one of driving modes of a vehicle based on an external input condition, wherein the external input condition includes one of turning ON or OFF of an electronic stability control or turning ON or OFF of a sports mode among selectable driving modes of the vehicle;
when turning OFF of the electronic stability control or turning ON of the sports mode is input and held for a predetermined entry delay time, determine that the vehicle is in a circuit driving mode; and
calculate a remaining fuel quantity using a different manner corresponding to each driving mode, wherein the remaining fuel quantity is calculated based on fuel consumption of an engine in the circuit driving mode; and
a fuel gauge configured to provide the calculated remaining fuel quantity.

7. The fuel measurement system according to claim 6, wherein the controller is configured to:
when the electronic stability control is ON or the sports mode is OFF, determine that the vehicle is in a general driving mode.

8. The fuel measurement system according to claim 7, wherein, when it is determined that a driving mode of the vehicle is a general driving mode, the controller is configured to:
apply damping time preset based on vehicle speed to fuel level information to calculate a residual fuel quantity; and
display the calculated residual fuel quantity through the fuel gauge.

9. The fuel measurement system according to claim 7, wherein the controller is configured to:
receive fuel level information from a fuel sending unit provided in a fuel tank of the vehicle in real time; and
receive information about the fuel consumption of the engine from an engine control unit of the vehicle in real time.

10. The fuel measurement system according to claim 6, wherein the controller is configured to:
when turning ON of the electronic stability control or turning OFF of the sports mode is input and held for a predetermined exit delay time, determine that the vehicle is in a general driving mode.

11. The fuel measurement system according to claim 10, wherein the controller is configured to:
when the ON-state of the electronic stability control or the OFF-state of the sports mode is not maintained for the predetermined exit delay time from an input point, determine that the driving mode of the vehicle is a previous driving mode.

12. The fuel measurement system according to claim 6, wherein the controller is configured to:
when the OFF-state of the electronic stability control or the ON-state of the sports mode is not maintained for the predetermined entry delay time from the input point, determine that a driving mode of the vehicle is a previous driving mode.

13. The fuel measurement system according to claim 6, wherein, when it is determined that a driving mode of the vehicle is the circuit driving mode, the controller is configured to:
display the calculated remaining fuel quantity through the fuel gauge.

* * * * *